US012017472B2

(12) United States Patent
Roudaut

(10) Patent No.: US 12,017,472 B2
(45) Date of Patent: Jun. 25, 2024

(54) POROUS COLOR LINKER

(71) Applicant: SOCIETE BIC, Clichy (FR)

(72) Inventor: Etienne Roudaut, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 48 days.

(21) Appl. No.: 17/596,461

(22) PCT Filed: Jul. 2, 2020

(86) PCT No.: PCT/EP2020/068737

§ 371 (c)(1),
(2) Date: Dec. 10, 2021

(87) PCT Pub. No.: WO2021/004905

PCT Pub. Date: Jan. 14, 2021

(65) Prior Publication Data

US 2022/0234379 A1 Jul. 28, 2022

(30) Foreign Application Priority Data

Jul. 5, 2019 (EP) .................................... 19184814

(51) Int. Cl.

*B43K 23/06* (2006.01)
*B43K 8/02* (2006.01)
*B43K 27/08* (2006.01)

(52) U.S. Cl.

CPC .............. *B43K 23/06* (2013.01); *B43K 8/026* (2013.01); *B43K 27/08* (2013.01)

(58) Field of Classification Search

CPC ......... B43K 1/006; B43K 23/06; B43K 27/08
See application file for complete search history.

(56) References Cited

U.S. PATENT DOCUMENTS

| | | | |
|---|---|---|---|
| 5,306,092 | A | 4/1994 | Jenq |
| 5,332,326 | A | 7/1994 | Hori |
| 5,368,405 | A | 11/1994 | Sixiong |
| 5,388,924 | A | 2/1995 | Chao |
| 5,440,327 | A | 8/1995 | Stevens |
| 5,685,224 | A | 11/1997 | Dean et al. |

(Continued)

FOREIGN PATENT DOCUMENTS

| | | | |
|---|---|---|---|
| CN | 2827748 | Y | 10/2006 |
| GB | 2277253 | A | 10/1994 |

(Continued)

OTHER PUBLICATIONS

International Search Report and Written Opinion in International Application No. PCT/EP2020/068737, mailed Aug. 12, 2020 (8 pages).

(Continued)

*Primary Examiner* — David P Angwin
*Assistant Examiner* — Bradley S Oliver
(74) *Attorney, Agent, or Firm* — Bookoff McAndrews, PLLC

(57) ABSTRACT

The application relates to a porous color linker comprising a tip portion configured to deposit indicia on a writing surface; a mixing portion configured to combine a plurality of inks; and a base portion having a first receiving portion configured to receive a tip of a first ink discharge device and a second receiving portion configured to receive a tip of a second ink discharge device.

20 Claims, 5 Drawing Sheets

(56) References Cited

U.S. PATENT DOCUMENTS

| | | | | |
|---|---|---|---|---|
| 5,775,828 | A | 7/1998 | Ikeda | |
| 5,971,643 | A * | 10/1999 | Ahmed | B43K 27/00 401/44 |
| 6,554,517 | B2 | 4/2003 | Ahmed | |
| 6,715,950 | B2 * | 4/2004 | Kim | B43K 27/04 401/35 |
| 7,255,508 | B1 | 8/2007 | Knight | |
| 7,445,394 | B2 | 11/2008 | Lapstun et al. | |
| 9,303,820 | B2 | 4/2016 | Miller | |
| 10,195,635 | B2 * | 2/2019 | Sporrer | A61L 26/0061 |

FOREIGN PATENT DOCUMENTS

| | | | |
|---|---|---|---|
| NL | 1008489 | C1 | 9/1999 |
| WO | 2019077262 | A1 | 4/2019 |

OTHER PUBLICATIONS

Blendy Pens, Chameleon Kidz! [retrieved on Nov. 24, 2021]. Retrieved from the Internet: <URL: https://www.chameleonkidz.com/product>.

Unique Tools, Unique Results, Chameleon [retrieved on Nov. 24, 2021]. Retrieved from the Internet: <URL: https://www.chameleonartproducts.com/unique-tools-unique-results>.

* cited by examiner

POROUS COLOR LINKER

CROSS-REFERENCE TO RELATED APPLICATIONS

This application is a National Stage Application of International Application No. PCT/EP2020/068737, filed on 2 Jul. 2020, now published as WO2021004905A1 and which claims priority from EP19184814.2, filed on 5 Jul. 2019, the entire contents of which is incorporated herein by reference.

BACKGROUND

1. Field

The following description relates to a porous color linker, and more particularly to porous color linker configured to mix inks and deposit the mixed ink onto a writing surface.

2. Description of Related Art

Conventional mixable ink systems that allow a user to use one writing instrument while having the ability to use different colors of ink typically use a replaceable and/or refillable ink cartridge. A refillable ink cartridge can be attached to a separate device having a plurality of reservoirs of ink. The cartridge can be filled with a custom combination of inks to achieve a desired color and then cartridge may be inserted into the writing instrument. See, for example, WO 2019/077262. Also, see GB2277253 disclosing a marking pen capable of writing in more than one color and U.S. Pat. No. 5,388,924 disclosing a pen practical for drawing lines having different shades.

A common drawback of conventional ink mixing systems is that they are complex and difficult to use. Additionally, they have a lot of components and can be expensive.

SUMMARY

The present disclosure provides a porous color linker comprising a tip portion configured to deposit indicia on a writing surface; a mixing portion configured to combine a plurality of inks; and a base portion having a first receiving portion configured to receive a tip of a first ink discharge device and a second receiving portion configured to receive a tip of a second ink discharge device.

The capillary action of the porous color mixer is superior to a conventional plastic tip. The porous color mixer can adequately mix multiple colors together and due to the capillary action of the porous color mixer, it is superior to a conventional plastic tip at mixing colors and depositing the mixed ink. Additionally, this configuration reduces the risk of back pollution, e.g. color form one marker enters into the other marker. The mixing portion of the porous color linker allows for mixing adequately multiple colors together.

The porous color linker may comprise sintered plastic.

The porous color linker may be washable, thus in particular making it reusable. Specifically, the porous color linker may be reusable.

The porous color linker may have a pore size within a range of 2 to 150 microns.

The distance between the tip interface and final tip end of the porous color linker may be in a range of 4 to12 mm.

The tip portion of the porous color linker may be tapered between the tip interface (i.e. the transition point between mixing portion and tip portion) and final tip end (i.e. where the tip touches the writing surface).

The cross-section of the tip portion may have a circular shape.

The cross-section of the tip portion may have a rectangular shape.

In some embodiments, an ink mixing assembly comprises the aforementioned porous color linker and a casing attached to the base portion of the porous color linker. The casing is configured to receive a first ink discharge device and a second ink discharge device.

The casing may be configured to hold a tip of the first ink discharge device into the first receiving portion of the porous color linker and is further configured to hold a tip of the second ink discharge device into the second receiving portion of the porous color linker.

The above summary is not intended to describe each and every implementation of the concept. In particular, selected features of any illustrative embodiment within this disclosure may be incorporated into additional embodiments unless clearly stated to the contrary.

BRIEF DESCRIPTION OF THE DRAWINGS

The disclosure may be more completely understood in consideration of the following detailed description of aspects of the disclosure in connection with the accompanying drawings, in which.

DETAILED DESCRIPTION

Figure 1:
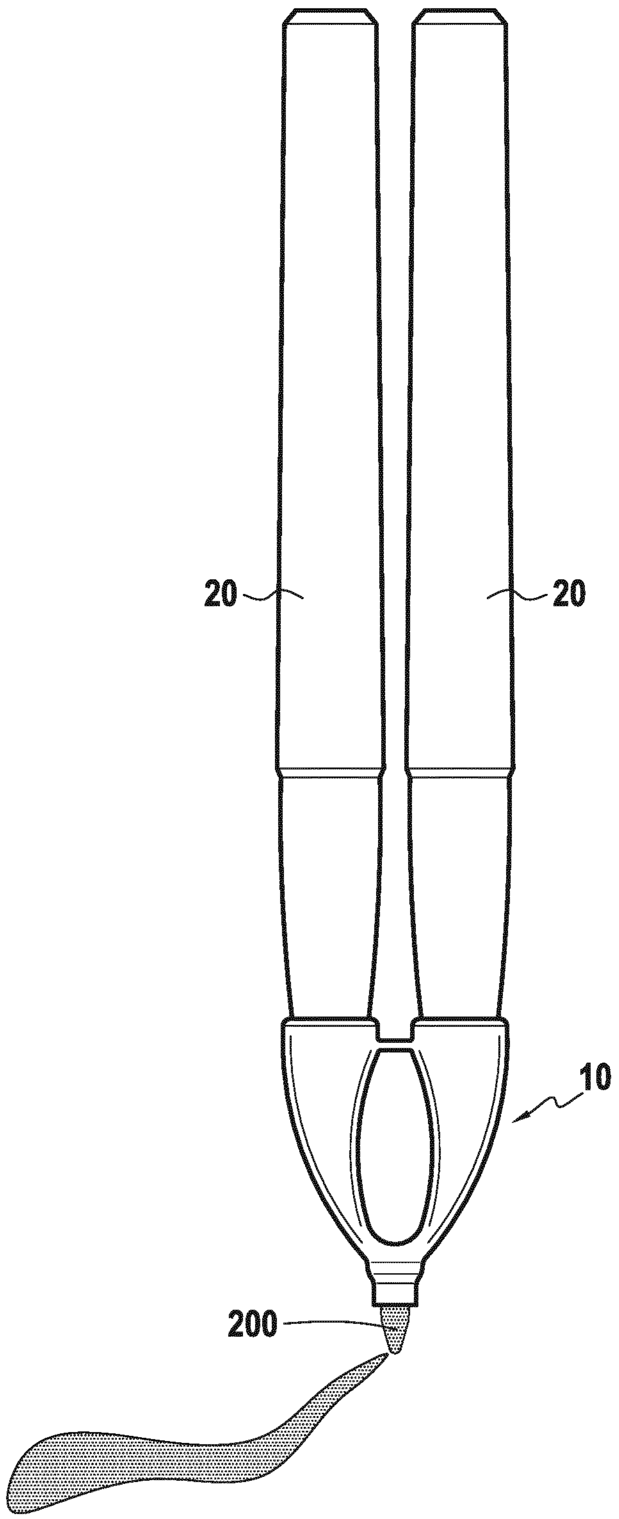
FIG. 1 details an ink mixing assembly according to a first aspect.

FIG. 1 shows an ink mixing assembly 10. The ink mixing assembly 10 may be configured to mix two or more inks. The inks may be contained within ink discharge devices 20. An ink discharge device 20 may be, for example, a color marker. Although the ink mixing assembly 10 shown includes 2 ink discharge devices 20, the ink mixing assembly 10 may be configured to receive more than two ink discharge devices 20.

Figure 2:
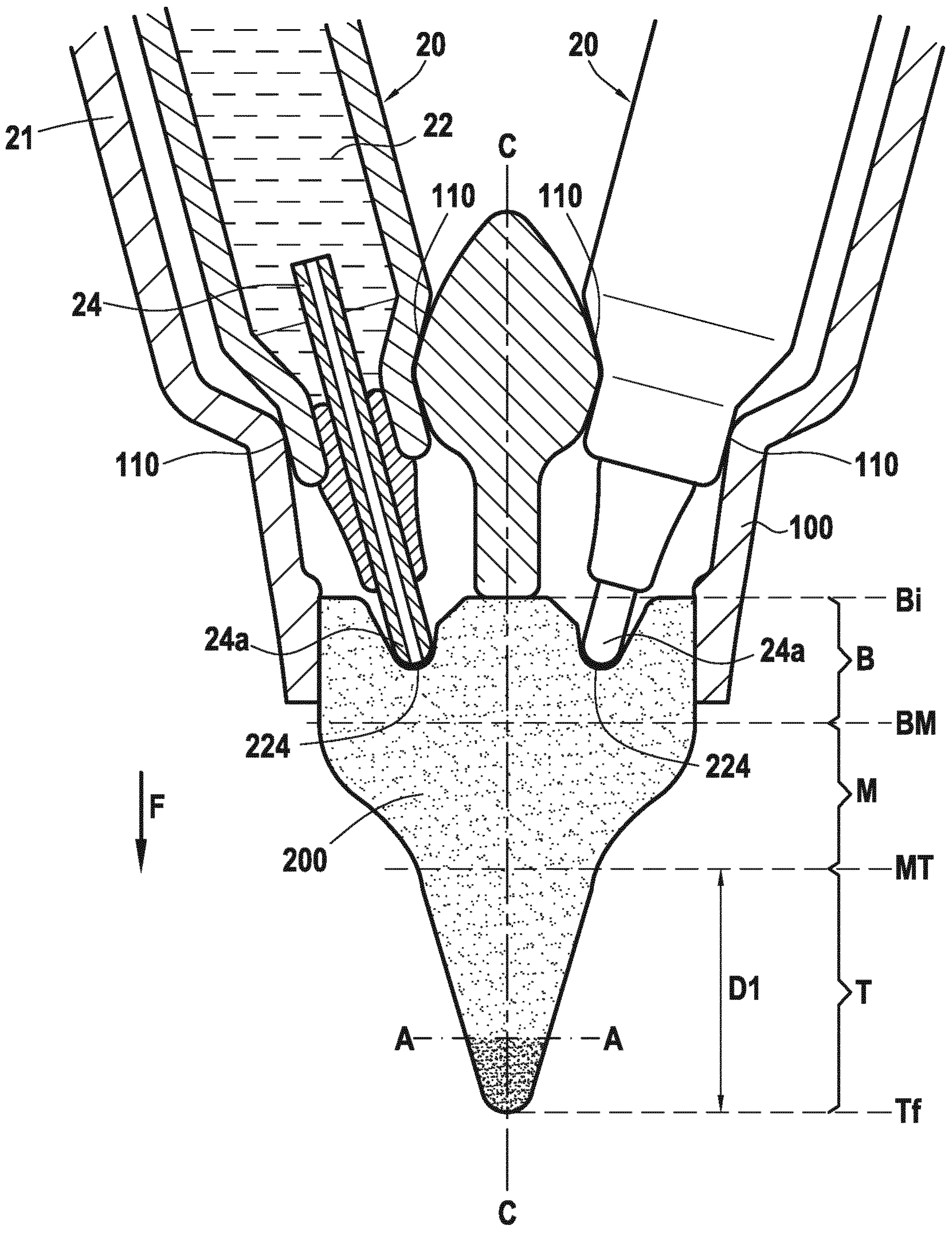
FIG. 2 details a cross-section of the ink mixing assembly of FIG. 1.

FIG. 2 shows a cross-section of the ink mixing assembly 10 having two ink discharge devices 20. The ink mixing assembly 10 may include a casing 100 and a porous color linker 200.

An ink discharge device 20 may include a barrel 21 which encloses an ink 22 therein. The ink 22 may be in contact with an ink transfer element 24. The ink transfer element 24 may include a tip 24*a*, which may be plastic. The tip 24*a* may be configured to deposit ink onto a writing surface. A writing surface, may be, for example, a piece of paper, cardboard, or any other surface where the ink may be deposited.

The casing 100 may be a polymer of any other suitable material, for example, metal. The casing 100 may have openings 110 that are configured to receive an ink discharge device 20. The openings 110 of the casing 100 may be configured to secure a respective ink discharge device 20 to the casing 100 such that the tip 24*a* is securely contacting a respective first or second receiving portion 224 of the porous color linker 200.

The porous color linker 200 may be formed of a sintered polymer. The porous color linker 200 may be washable and reusable. The average pore size of the pores formed in the porous color linker may be within a range of 2 to 150 microns. The porous color linker 200 may include a tip portion T, mixing portion M, and base portion B.

The base portion B may include a first receiving portion 224 configured to receive a tip 24*a* of a first ink discharge device 20 and a second receiving portion 224 configured to receive a tip 24*a* of a second ink discharge device 20. The ink that is in the first and second ink discharges devices 20 may to transferred to the base portion B by capillary action in the flow direction F. The base portion B may be defined as the portion of the porous color linker 200 from surface Bi which is disposed within the casing 100 and in contact with at least one of the ink discharge devices 20 to the mixing interface BM where the mixing portion M begins.

The ink then may be transferred into the mixing portion M. The mixing portion M may be configured to combine and mix the plurality of inks drawn from the base portion B. The mixing portion M may be defined as the portion of the porous color linker 200 between the mixing interface BM and the tip interface MT. The mixing portion M has a first tapering toward a center axis C in order to mix the different inks, make a more concentrated ink, and prevent backflow of an incorrect ink color into the first and second ink discharge devices 20. The tip interface MT is the transition point between mixing portion M and tip portion T.

Thereafter, the mixed ink may be transferred into the tip portion T. The tip portion T may be configured to deposit indicia, or the mixed ink, on a writing surface. The tip portion T has a second tapering toward the center axis C, that is less than the first tapering of the mixed portion M. This second tapering is configured to create a concentrated ink. The height D1 of the tip portion T may be greater than the width of the tip portion T. The height D1 may be in a range of 4 to 12 mm. The tip portion may be defined as the portion of the porous color mixer between the tip interface MT and the final end of the tip Tf. A cross-section of the tip taken along plane A-A may be circular. However, it is envisioned that the cross-section may be oval or rectangular.

Figure 3:
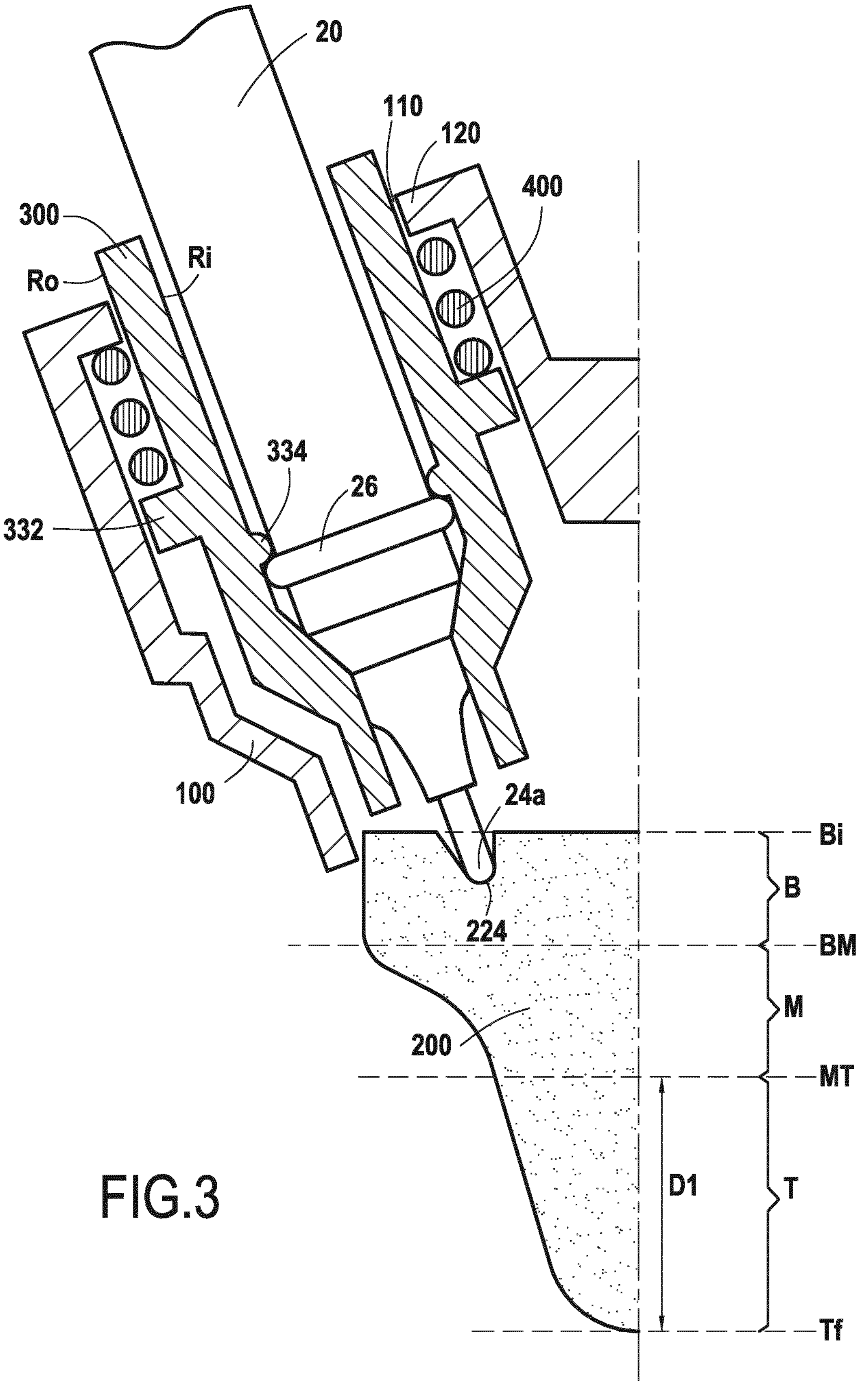
FIG. 3 details a cross-section of the porous color linker according to a second aspect.

The ink mixing assembly in FIG. 3 is the same as the ink mixing assembly in FIGS. 1-2 except for a pressure regulation assembly. Therefore, the detailed description of similar features will be omitted and like reference numerals will be used.

An ink discharge device 20 may include a tip 24*a*, which may be plastic. The tip 24*a* may be configured to deposit ink onto a writing surface.

The casing 100 may be a polymer of any other suitable material, for example, metal. The casing 100 may comprise a pressure regulation assembly having a discharge device receiver 300 and a spring 400. The casing 100 may be formed with a lip 120 positioned about the opening 110 and extends radially inward.

The discharge device receiver 300 may be dimensioned to enclose the outer circumference of the discharge device 20, but allow the tip 24*a* to contact a respective first or second receiving portion 224 of the porous color linker 200. The discharge device receiver 300 may have a substantially cylindrical shape and include an inner surface Ri and an outer surface Ro.

The inner surface Ri of the discharge device receiver 300 may include a securing member 334. The securing member 334 may be formed as a protuberance, a plurality of protuberances, or a recess.

The discharge device 20 may include a fixing member 26 formed on the outer surface thereof. The fixing member 26 may be configured to contact the securing member 334. The fixing member 26 may be formed as a protuberance, a plurality of protuberances, or a recess so long as it is formed to correspond with the securing member 334 to fix the discharge device 20 into the discharge device receiver 300.

The discharge device receiver 300 may comprise one or more flange(s) 332 formed on the outer surface Ro thereof. The flange 332 may be dimensioned to extend from the outer surface Ro of the discharge receive device 300 and be enclosed within the casing 100 such that the discharge receiving device 300 is moveable relative to the casing 100.

The pressure regulation comprised a spring 400. The spring 400 may be positioned about the outer surface Ro of the discharge receiving device 300 and between the flange 332 and lip 120 of the casing. In this configuration, the spring 400 may apply a pressure on the discharge receiving device 300. The spring 400 may be formed as a helical spring. The spring may comprise any suitable material, for example metal or plastic.

In operation, a user may insert a discharge device 20 into the discharge receiving device 300. The discharge device 20 may be operably fixed to the discharge receiving device 300 due to the contact between the securing member 334 and the fixing member 26. Due to the pressure exerted by the spring 400 on the discharge receiving device, the tip 24*a* of the discharge device 20 is held into place in the receiving portion 224 of the porous color linker 200. Further, due to the contact between the securing member 334 and the fixing member 26, the spring 400 may be maintained in a compressed configuration. In this configuration, the ink mixing assembly provides a consistent contact between the tip 24*a* of the discharge device 20 and the porous color linker 200. This permits a consistent flow of ink while also reducing the occurrence of damage of the tip 24*a* of the discharge device 20.

Similar to the porous color linker 200 of FIG. 2, the ink that is in the discharge device 20 may be to transferred to the base portion B, mixing portion M, and tip portion T by capillary action. The tip portion T may be configured to deposit indicia, or the mixed ink, on a writing surface.

Figure 4:
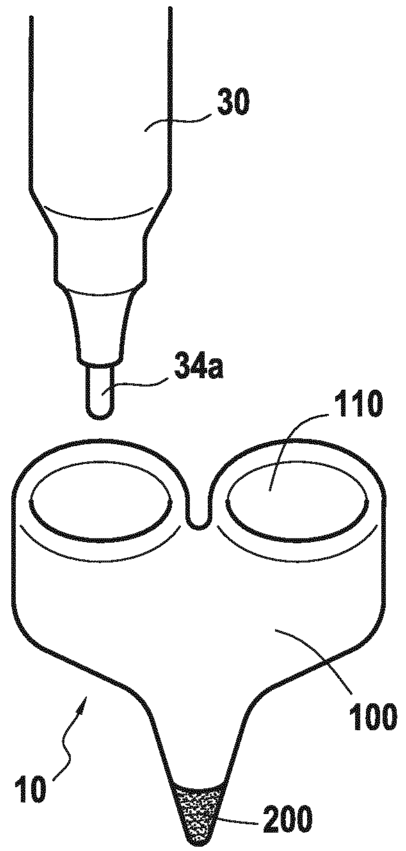
FIG. 4 details an ink mixing assembly according to a third aspect.

The ink mixing assembly in FIG. 4 is similar to the ink mixing assemblies in FIGS. 1-3. Therefore, the detailed description of similar features will be omitted and like reference numerals will be used.

An ink discharge device 30 may include a tip 34*a*, which may be felt. The tip 34*a* may be configured to deposit ink onto a writing surface.

The casing 100 may be a polymer of any other suitable material, for example, metal. The casing 100 may or may not comprise a pressure regulation assembly having a discharge device receiver 300 and a spring 400.

In this configuration, the user receives the benefit that felt tip discharge devices 30 are able to be effectively converted into a plastic tip writing instrument.

Figure 5:
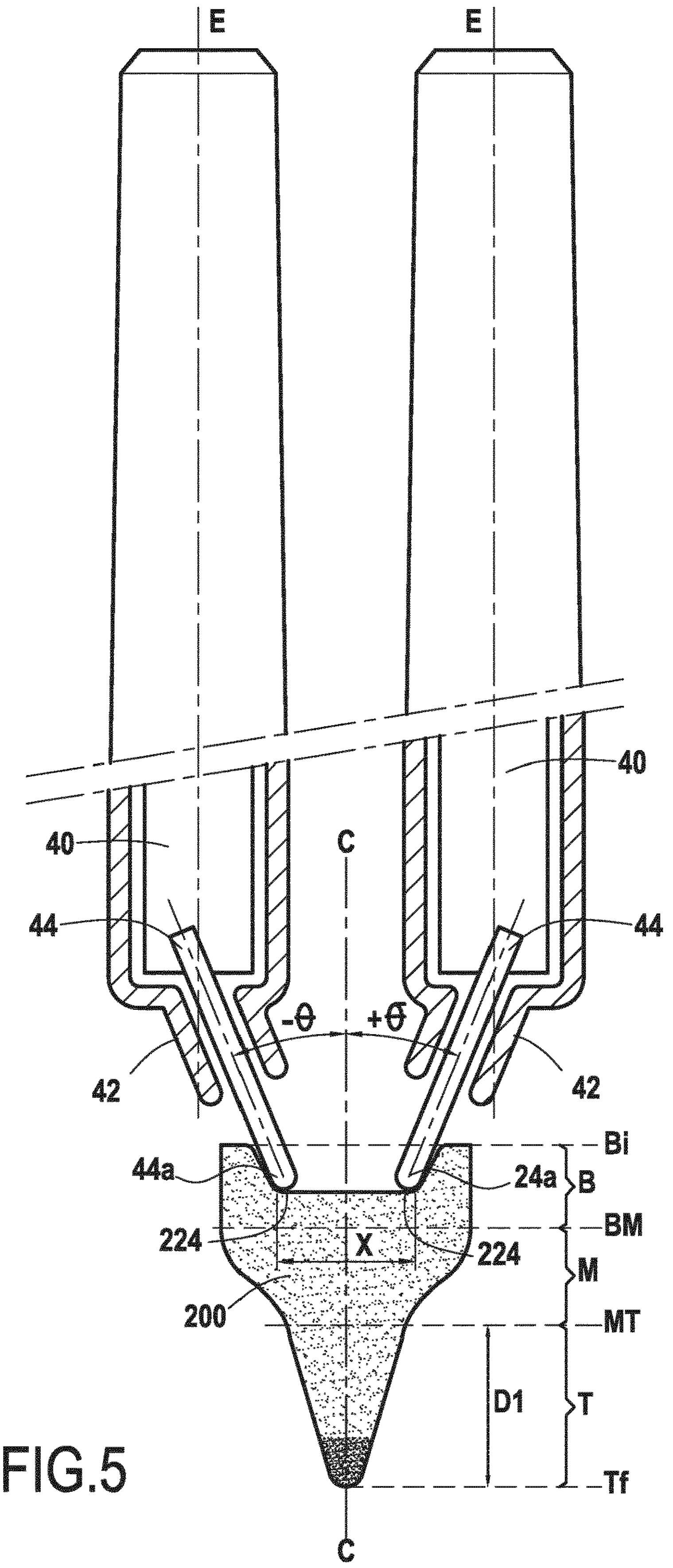
FIG. 5 details a cross-section of the porous color linker according to a fourth aspect.

The ink mixing assembly in FIG. 5 is similar to the ink mixing assemblies in FIGS. 1-4 except that the discharge devices 40 may include an angled tip 44*a* and the ink linking assembly is configured to accommodate the angled discharge devices 40. Therefore, the detailed description of similar features will be omitted and like reference numerals will be used.

An ink discharge device 40 may have a center axis E, and end 42 and an elongated ink transfer element 44 having a tip 24*a*, which may be felt. The tip 24*a* may be configured to deposit ink onto a writing surface.

The end 42 may be angled relative to the center axis E such that the ink transfer element 44 is positioned at an angle ±θ relative to the center axis C of the porous color linker 200. The angle ±θ may be within a range that positions the center axis E of the discharge device 40 to be parallel or substantially parallel with the center axis C of the porous color linker 200.

To account for the angled tips 44*a* of the discharge devices 40, the base portion B of the porous color linker may only one receiving portion 224 configured to receive the tips 44*a* of the first and second ink discharge devices 40. The receiving portion 224 may have a dimension x such that the tips 44*a* of different discharges devices 40 are separated from each other to prevent the occurrence of backflow or contaminating a discharge device 40 with the incorrect ink.

The benefit of this configuration is that by angling the tips 44*a* of the discharge devices 40 such that the axis E of discharge devices 40 are parallel or substantially parallel to the center axis C of the porous color linker 200, the ink mixing assembly and discharge devices are more compact. As such, it facilitates the user's manipulation of the ink mixing assembly and discharge devices. Additionally, the shorter distance x and single receiving portion 224, enhances the porous color linker's ability to mix the multiple inks.

The operation of the porous color linker 200 remains the same as the porous color linker 200 of FIGS. 1-4. That is, the ink is transferred to the base portion B, mixing portion M, and tip portion T by capillary action. The tip portion T may be configured to deposit indicia, or the mixed ink, on a writing surface.

Figure 6:
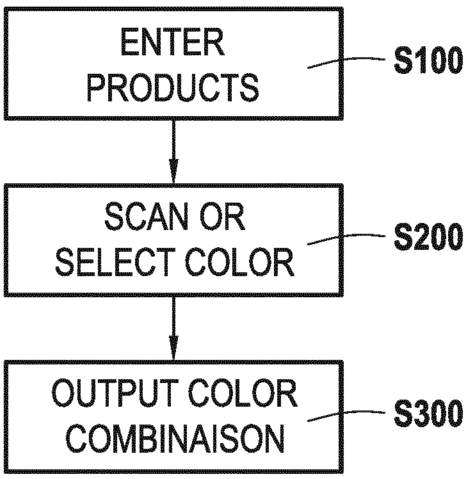
FIG. 6 details a flow chart for a method of mixing colors.

FIG. 6 shows a flow chart showing a method of mixing colors. It is envisioned that the casing 100 of any of the aforementioned embodiments may be configured to work with a digital application that assists the user in discovering which mixtures of ink result in a particular color, for example, red and yellow ink result in an orange color or yellow and blue ink result in a green color.

As such, the ink mixing assembly 10 may be of a digital type connected to a digital device or directly to the Internet Of Things (IOT) through a wireless connection allowing and advising the user on how to mix different discharge devices, for example, felt pens. Therefore, the ink mixing assembly may include a camera, processing unit, control unit, and transmitter.

The ink mixing assembly 10 may be communicatively connected to the transmitter, and/or communicatively connected via a hardwire connection to an interface unit, which may be, for example a computer or mobile device.

In one communication path, the camera may be configured to capture image information, the processing unit may be configured to process the image information, and the control unit may be configured to send the image information via the transmitter. Communication technologies used by the ink mixing assembly to transmit information may include cellular, satellite, Bluetooth, low-power wide-area networks (LPWAN), or connecting directly to the internet via ethernet, which examples are not limiting.

The information received by the user device can be routed to the application which may provide a suggestion of ink combinations to reproduce the color information captured by the camera. The application may or may not be connected to an IoT gateway. If connected, the image information may be routed to a user platform. Based on the image information, the application or user platform can provide appropriate suggestions or feedback on the captured image information.

As shown in S100, the user first enters into the application which products are being used, for example, the model of the ink mixing assembly and the series of ink discharge devices, for example ink markers. As shown in S200, the user can either select a color on the application and receive a suggestion on the mixture of inks to use with the ink mixing assembly or the user may use the camera on the device to capture image data, send the data to the application, and allow the application the suggest the mixture of inks to use with the ink mixing assembly to reproduce the captured image data. In S300, the user follows the suggestion by the application by arranging the appropriate ink discharge devices into the ink mixing assembly and outputs or deposits the mixed ink on a writing surface.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure. Additionally, any of the features of the described embodiments are combinable when not conflicting.

It is intended that the specification and examples be considered as exemplary only, with a true scope of the disclosure being indicated by a fair reading of the following claims.

The invention claimed is:

1. A porous color linker comprising:

a tip portion configured to deposit indicia on a writing surface;

a mixing portion configured to combine a plurality of inks to form a concentrated ink mixture; and a base portion having a first receiving portion configured to receive a tip of a first ink discharge device and a second receiving portion configured to receive a tip of a second ink discharge device, wherein an entirety of the tip portion is configured to deposit indicia formed only by the concentrated ink mixture of a single color.

2. The porous color linker according to claim 1 comprises sintered plastic.

3. An ink mixing assembly comprising:

the porous color linker of claim 2; and a casing attached to the base portion of the porous color linker, wherein the casing is configured to receive a first ink discharge device and a second ink discharge device.

4. The porous color linker according to claim 1 is reusable.

5. An ink mixing assembly comprising:

the porous color linker of claim 3; and a casing attached to the base portion of the porous color linker, wherein the casing is configured to receive a first ink discharge device and a second ink discharge device.

6. The porous color linker of claim 1, wherein the pore size is within a range of 2 to 150 microns.

7. An ink mixing assembly comprising:

the porous color linker of claim 4; and a casing attached to the base portion of the porous color linker, wherein the casing is configured to receive a first ink discharge device and a second ink discharge device.

8. The porous color linker of claim 1, wherein the distance between a tip interface and a final tip end is in a range of 4 to 12 mm.

9. An ink mixing assembly comprising:

the porous color linker of claim 5; and a casing attached to the base portion of the porous color linker, wherein the casing is configured to receive a first ink discharge device and a second ink discharge device.

10. The porous color linker of claim 1, wherein the tip portion is tapered between a tip interface and a final tip end.

11. The porous color linker of claim 1, wherein a cross-section of the tip portion has a circular shape.

12. The porous color linker of claim 1, wherein a cross-section of the tip portion has a rectangular shape.

13. An ink mixing assembly comprising:

the porous color linker of claim 1; and a casing attached to the base portion of the porous color linker, wherein the casing is configured to receive a first ink discharge device and a second ink discharge device.

14. The ink mixing assembly of claim 13, wherein the casing is configured to hold a tip of the first ink discharge device into the first receiving portion of the porous color linker and is further configured to hold a tip of the second ink discharge device into the second receiving portion of the porous color linker.

15. The porous color linker according to claim 1, wherein the tip portion is between a tip interface and a final tip end, and the mixing portion is between a mixing interface and the tip interface, wherein the mixing interface has a circumference that is larger than a circumference of the tip interface, and the circumference of the tip interface is larger than a circumference of the final tip end.

16. The porous color linker according to claim 15, wherein the mixing portion has a first curved tapering, and a second curved tapering opposite the first curved tapering with respect to a central axis extending between the first curved tapering and the second curved tapering, to mix the plurality of inks to form the concentrated ink mixture.

17. An ink mixing assembly comprising:

the porous color linker of claim 15; and a casing attached to the base portion of the porous color linker, wherein the casing is configured to receive a first ink discharge device and a second ink discharge device; and wherein the casing is configured to hold a tip of the first ink discharge device into a first receiving portion of the porous color linker and is further configured to hold a tip of the second ink discharge device into a second receiving portion of the porous color linker.

18. The porous color linker of claim 1, further including:

a pressure regulation assembly, the pressure regulation assembly including a case, a discharge device receiver, and at least one spring, wherein the case is mechanically attached to the base portion and the first ink discharge device and the second ink discharge device are retained within the discharge device receiver.

19. A porous color linker comprising:

a tip portion configured to deposit indicia on a writing surface;

a mixing portion configured to combine a plurality of inks;

a base portion having a first receiving portion configured to receive a tip of a first ink discharge device and a second receiving portion configured to receive a tip of a second ink discharge device; and a pressure regulation assembly, the pressure regulation assembly including a case, a discharge device receiver, and at least one spring, wherein the case is mechanically attached to the base portion and the first ink discharge device and the second ink discharge device are retained within the discharge device receiver.

20. The porous color linker of claim 19, wherein the discharge device receiver is retained within the case by the at least one spring such that the tip of the first ink discharge device and the tip of the second ink discharge device maintain contact with the first receiving portion and the second receiving portion of the base portion.

* * * * *